Sept. 29, 1936.  L. J. R. HOLST  2,055,492
METHOD OF AND APPARATUS FOR TAKING MOTION PICTURES
Filed May 16, 1930  2 Sheets—Sheet 1
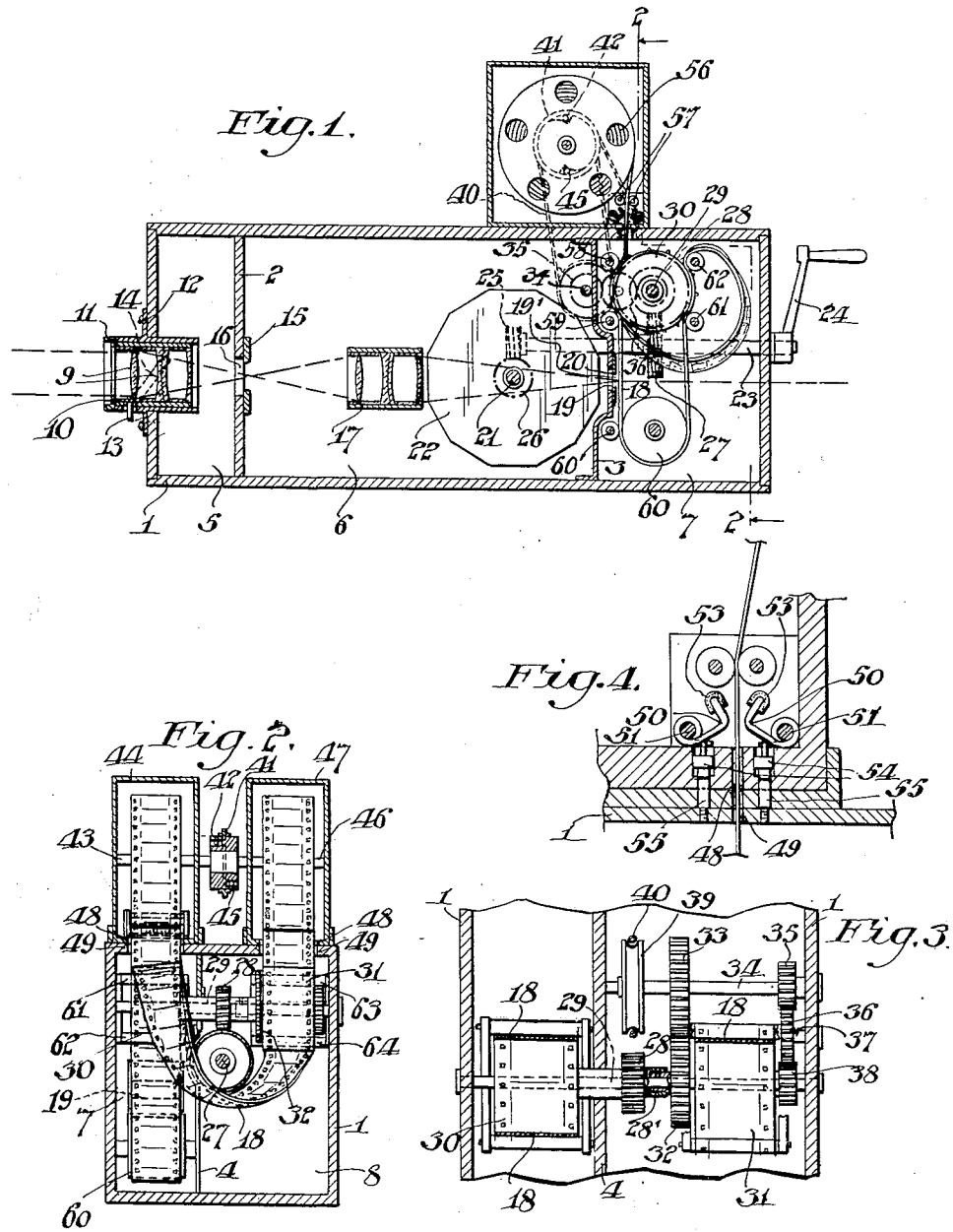
Inventor
Lodewyk J. R. Holst,
By [signature]
Attorney.

Sept. 29, 1936.　　　　　L. J. R. HOLST　　　　　2,055,492
METHOD OF AND APPARATUS FOR TAKING MOTION PICTURES
Filed May 16, 1930　　　　2 Sheets-Sheet 2
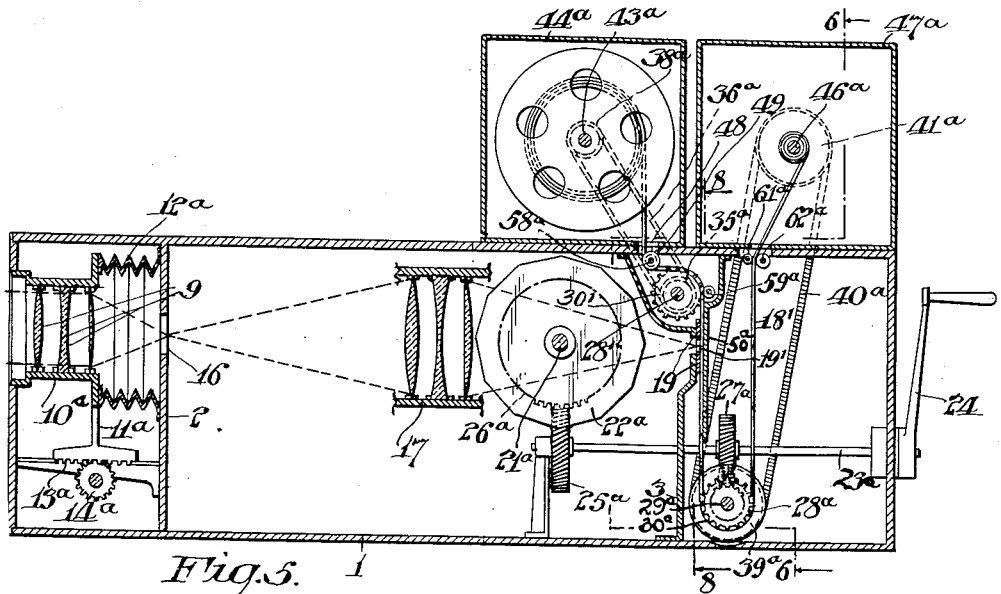
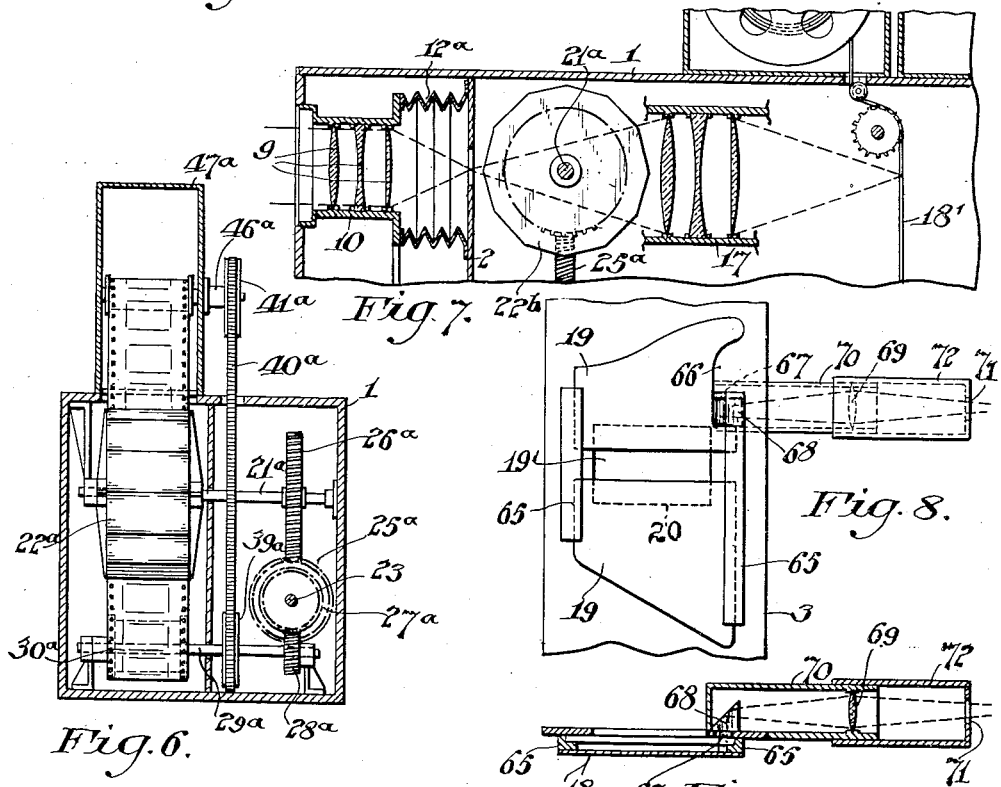

Patented Sept. 29, 1936

2,055,492

UNITED STATES PATENT OFFICE 2,055,492

METHOD OF AND APPARATUS FOR TAKING MOTION PICTURES

Lodewyk J. R. Holst, Brookline, Pa., assignor to The S. M. M. H. Corporation, Dover, Del., a corporation of Delaware Application May 16, 1930, Serial No. 452,871

4 Claims. (Cl. 88—16.8)

My invention is a method of and apparatus for producing chronophotographs by which actual uninterrupted continuous movements may be recorded as observed in looking at a scene instead of recording a series of quickly succeeding stationary images of positions reached after stated time intervals. My improvements result in the production of a film or image strip which, when properly projected, will show upon a screen completely natural changes in position of all moving objects in the scene and creates such a compelling mental impression as to give increased naturalness to even non-moving parts of the scene.

The film or image strip may also have formed thereon a photographic light record of sounds complementary to the adjacent images, and any effect of camera noise on the sound record may be eliminated by placing the sound recording instrument in any desired position away from the camera. By recording the light record of complementary sounds on the film as it passes the image gate, or immediately before or after this moment, the scene records and complementary sound records may be placed in or close to transverse coincidence to each other.

My improvements further provide improved means for feeding a sensitized strip to and from position for exposure to desired light rays, for rewinding the film without removing it from the camera, and for automatically opening communication between the film magazine and camera when positioned for use and sealing the film magazine when removed from the camera.

In accordance with my invention a sensitized film strip is moved continuously and preferably at a uniform rate past an image gate which may approximate in size the image of a scene to be recorded upon the film. Instead, however, of simultaneously recording the whole of an image, there is preferably provided an adjustable supplementary gate forming a narrow slot which passes at any one time the light rays from a fragmentary portion only of the image being recorded and by the adjustment of the height of the exposure slot the exposure period may be regulated.

The film section while subject to the action of the light rays lies adjacent to and preferably in the image focal plane of an image-forming lens which produces in such plane a replica of an aerial image formed by a photographic lens having its posterior or image focal plane coincident with the anterior or objective focal plane of the supplementary or auxiliary lens above referred to. The light rays acting upon the exposed film section are displaced laterally in synchronism with and at the same rate as the movement of the film so that when a narrow exposure slot is used there is imprinted upon the film sequential fragmentary portions of the image of the scene within the focus of the photographic lens. As the film advances across the slot and portions of the image are impressed thereon, there is produced on the film a series of photographs which when properly projected upon a screen give an accurate and exact reproduction of the movements in the original scene.

The deflection of the light rays in synchronism with the movement of the film is effected by means of a rotatable prism positioned in the axis of the lenses and preferably in the image space of the supplementary lens. By thus positioning the prism, a prism of practical size may be used. Moreover, the rays passing through a prism located in the image space of a lens are converging and hence there is obviated the dimming of related image sections which tends to result where parallel or diverging rays are passed through a prism block, and which latter results in failure of part of the light rays to penetrate the prism block and their reflection back from prism surfaces when the angle of incidence of the rays with steeply inclined prism surfaces is sufficiently large. When converging beams, instead of diverging or parallel beams, of light are caused to traverse a prism, the angles of incidence of the light beams are greatest when the prism presents its surfaces normal to the optical axis and gradually decrease until the line of separation between two prism surfaces is in the horizontal plane of the optical axis, hence a substantially constant amount of light is passed through the prism and the rays thereof are bent at a rate proportionate to the rate or rotation of the prism.

Films so produced, or prints made therefrom, are preferably exhibited by the continuous movement thereof through a projector having optical parts similar to those employed in my camera and through which light rays passing from an image on the film are focused by an auxiliary lens to form an aerial image in the objective focal plane of a projecting lens, the rays being displaced during their passage to compensate for the continuous movement of the film. It will generally be preferable in taking pictures to have the sensitized film surface coincident with the image focal plane of the supplementary lens and thereby produce sharply defined images on the film suitable for exhibition in standard projectors having a shutter and intermittent film feeding means as well as in my special projector.

The characteristic features and advantages of my improvements will further appear from the following description and the accompanying drawings of illustrative embodiments of my invention:

In the drawings, Fig. 1 is a somewhat diagrammatic longitudinal sectional view of a camera illustrating a preferred embodiment of my improvements; Fig. 2 is a transverse sectional view on the line 2—2 of Fig. 1; Fig. 3 is an enlarged fragmentary sectional view illustrating details of driving mechanism; Fig. 4 is an enlarged fragmentary sectional view of the film slot control mechanism applicable to the several embodiments of my invention; Fig. 5 is a diagrammatic longitudinal sectional view of a modified form of camera; Fig. 6 is a transverse sectional view of the line 6—6 of Fig. 5; Fig. 7 is a diagrammatic fragmentary longitudinal sectional view of a further modified arrangement of the optical elements of the camera shown in Fig. 5; Fig. 8 is an enlarged fragmentary view illustrating details of gate and sound recording mechanism applicable to the several embodiments of my invention illustrated by the previous figures; and Fig. 9 is a transverse sectional view of the mechanism shown in Fig. 7.

As illustrated in Figs. 1 to 4 inclusive of the drawings, the camera housing or casing 1 is divided by partitions 2, 3, and 4 into chambers 5, 6, 7, and 8. A photographic lens 9 is mounted in a tube 10 sleeved in the cylindrical barrel 11 seated in the front wall of the chamber 5 and secured thereto by a flange 12. The lens tube 10 is adjustable to focus the lens 9 by means of a pin 13 fixed thereto and movable in an inclined slot 14 in the barrel 11. By proper adjustment of the focus of the lens, an aerial image is formed substantially in the plane of the adjustable gate leaves 15 controlling an aperture 16 through the partition 2.

An adjustable auxiliary lens 17 is mounted in the chamber 6 with its front focal plane coincident with the posterior focal plane of the lens 9, and the diverging rays from the image formed in the plane of the gate leaves 15 are caused by passage through the lens 17 to converge in a focal plane substantially coincident with the plane of a sensitized strip of film 18 in its passage past the slot 19' (Fig. 8) of the adjustable gate leaves 19 which control the image gate or aperture 20 in the partition 3.

Shafts 21, journalled in suitable brackets or in the camera housing have fixed thereto cheek plates engaging between them a twelve sided prism block of optical glass 22 disposed in the optical axis of the lens 17 and preferably positioned between such lens and the gate 19, so that converging rays passing from the lens 17 to the gate 19 are displaced by the rotation of the prism block 22 in synchronism with and in proportion to the movement of the sensitized strip 18 past the slot 19'.

The synchronous movement of the prism block and sensitized strip may be effected by means of a shaft 23 journalled in the camera and provided with a crank or handle 24. The shaft 23 has fixed thereto a worm 25 which meshes with a worm wheel 26 fixed on a shaft 21 of the prism block 22. A second worm 27, fixed to the shaft 23, meshes with a worm wheel 28 fixed to the shaft 29. A sprocket 30 is fixed to the shaft 29 and sprocket 31 is loosely sleeved on the shaft 29 coaxially with the sprocket 30. A gear wheel 32 (Fig. 3) is fixed to the hub 28' of the worm wheel 28 and meshes with a gear 33 fixed to a shaft 34 journalled in the camera housing. A gear 35 fixed to the shaft 34 meshes with an idler gear 36 journalled on a stub shaft 37 fixed to the housing wall. The idler 36 meshes with a gear 38 fixed to the sprocket wheel 31.

It will thus be seen that the rotation of the shaft 23 by the handle 24 acts through the gears 25 and 26 to rotate the prism 22; acts through the gears 27 and 28 to rotate the sprocket 30; and acts through the gear train 27, 28, 32, 33, 35, 36, and 38 to rotate the sprocket 31 in a direction opposite to the direction of rotation of the sprocket 30. The prism block 22, sprocket 30 and sprocket 31 are thus rotated in synchronism with one another and at such same rate of speed that the rays passing through the block 22 are displaced downward at the rate at which the film 18 moves downward past the slot 19'.

The shaft 34 has fixed thereto a pulley 39 which is connected by a belt 40 with a pulley 41 which may be connected by a ball clutch 42 with a shaft 43 journalled in the film supply magazine 44, or, when reversely operated, the pulley 41 may be connected through the oppositely acting ball clutch 45 with the shaft 46 journalled in the film take-up magazine 47. Consequently when the shaft 23 is rotated in one direction it acts through the parts described to rotate the shaft 46 carrying the film take-up roll, and when the shaft 23 is rotated in the opposite direction it acts through the parts described to rotate the shaft 43 carrying the film supply roll.

The film magazines 44 and 47 are each provided with a slot 48 (Fig. 4) adapted to register with a slot 49 in the top of the camera. The slot 48 is normally closed to light by a pair of shields 50 journalled on the stubs 51 and normally turned toward closed position by suitable springs. The edges of the shields 50 are preferably edged with velvet 53 or the like to better seal the joint between the shields or flaps 50 when the latter are in closed position. Stubs 54 mounted in recesses in the bottom of the film magazines 45 are elevated by bosses 55 fixed in the top of the camera housing so as to open the flaps 50 as the film magazine is properly seated on the top of the camera housing.

The film of the supply roll 56 is drawn downward, between guide rollers 57 and through the slots 48, 49, by the rotation of the sprocket 30 against which the film is held by pressure rollers 58 and 59. It then passes downward over the idler roller 60 against which the film is held by a spring roller 60', so that the film moves downward past the gate aperture tangentially to the periphery of the idler 60. After passing around the roller 60, the film moves upward and is again engaged against the sprocket 30 by pressure rollers 61 and 62, and on passing over the latter the film is bent in a free loop as illustrated in Fig. 2 and passes over the sprocket 31, against which it is held by pressure rollers 63 and 64. The film then passes upwardly through shielded slots 48 and 49 into the magazine 47 and is wound on a spool fixed to the shaft 46.

The width of the slot 19' through which the image is printed on the film, and consequently the duration of exposure, may be regulated by the adjustment of the gate members 19 (Figs. 8 and 9) which are slidable in the ways 65 on the partition 3. The edge of the upper gate member 19 is recessed as at 66 to clear an opening 67 by which a light beam is projected against the edge of the film from a triangular prism 68 to print a sound record thereon. A lens 69 in the tube 70 receives a beam of light through the slot 71 in the adjustable tube 72. The intensity of the beam passing through the slot 71 and concentrated upon the edge of the film by means of the lens 69 and prism 68 is varied by a photo-electric cell (not shown) or other suitable means for transforming sound waves into light rays so that a sound record and an image record are simultaneously made upon the film.

In the embodiment of my invention illustrated in Figs. 5 and 6, the lens tube 10a is adjustably supported by the bracket 11a having thereon a rack 13a meshing with the gear wheel 14a which may be operated by a suitable external knob to focus the photographic lens 9. The lens tube 10a is connected with the partition 2 by an accordion member 12a to permit the focusing of the lens 9 to form an aerial image substantially in the plane of the aperture 16 in the partition 2. The auxiliary lens 17 and rotatable prism 22a are mounted in the optical axis of the lens 9 and project the image formed in the plane of the aperture 16 onto the film 18' as it passes the slot 19' between the adjustable gate leaves 19 controlling the image aperture 20 in the partition 3.

The film 18' and prism block 22a are operated in synchronism so as to translate aerial image formed in the plane of the film at the rate of advance of the film past the slot 19' by means of a crank handle 24 connected with the shaft 23a journalled in the camera housing and having thereon a worm 25a which meshes with the gear 26a fixed on the shafts 21a supporting the prism block 22a through suitable cheek plates. The shaft 23a also has fixed thereon the worm 27a which meshes with a gear wheel 28a fixed on the shaft 29a of a toothed sprocket 30a.

The shaft 29a also has fixed thereto a pulley 39a which acts through the belt 40a to rotate the pulley 41a on the shaft 46a journalled in the film magazine 47a and carrying the film take-up roll. The film supply roll is mounted on a shaft 43a in the supply magazine 44a and is drawn by the sprocket 30a downward through slots 48 and 49, under the idler roller 58a and over a toothed sprocket 30' on the shaft 28'', the film being pressed against the sprocket 30' by the idler roller 59a. The film passing the slot 19' lies in a plane tangent to the rollers or sprockets 30' and 30a, and is shielded by an apron 50a.

After passing the slot 19' and passing over the sprocket 30a the film is carried upwardly between rollers 61a and 62a to a take-up spool on the shaft 46a in the magazine 47a.

When it is desired to reverse the movement of the film, the belt 40a is disengaged from the pulleys 39a and 41a and the crank handle 24 is disengaged from the shaft 23a and engaged on a projecting shank of the shaft 28'' of the sprocket 30'. The shaft 28'' has fixed thereto a pulley 35a which acts through a supplementary belt 36a to drive a pulley 38a fixed on the shaft 43a of the film magazine 44a and which carries the film supply spool.

The sound recording mechanism illustrated in Figs. 8 and 9 is applicable to this embodiment of my invention in the manner described in connection with the first described form of camera, and the operation of the entire apparatus will be obvious from the description of operations heretofore given.

The embodiment of my invention illustrated in Fig. 7 differs from the previously described apparatus only in the positioning of the prism block 22b in the objective space instead of the image space of the lens 17.

By my novel combination and arrangements of a film carrier, displacing prism and lenses, I am enabled to reproduce an image generated by the photographic lens and give such movement to the reproduction as accords with the film movement, which when moved continuously past a light aperture passing but a fragment of the image receives a proper exposure and a continuously changing life-like imprint of the scene, and concurrently therewith a complementary sound record substantially in transverse coincidence with the pertinent image. I am thus enabled to avoid in recording and reproducing the difficulties incident to making or reproducing scene records during intermittent movements of a film and complementary sound records during prior or subsequent continuous movements thereof.

Having described my invention, I claim:

1. In the method of producing chronophotographs, the steps which consist in continuously moving a sensitized strip, forming an aerial image, and forming a conjugate image of such aerial image, such conjugate image being coincident with the plane of movement of the sensitized strip, sequentially photographing upon said moving sensitized strip fragmentary portions of said conjugate image, the light rays forming such conjugate image being displaced each parallel to itself synchronously with the movement of said strip.

2. The method of producing chronophotographs which consists in continuously moving a sensitized strip, subjecting sequential sections of said strip to the action of light rays from sequentially adjacent fragmentary portions of a scene until a complete image of the scene has been photographed upon the sensitized strip, said strip being continuously exposed to the action of light rays from said scene during the photographing of a complete image of the scene and continuously repeating such photographing of fragmentary portions of the scene to form a series of related images upon the strip, each of said related images being maintained coaxially with said scene.

3. In motion picture apparatus with uniform film movement, the combination with film feeding mechanism and a rotatable plano-parallel rectifying member synchronized with the feeding mechanism and having at least two parallel surfaces, of a collective real image forming lens system having a focal plane coincident with the plane of movement of the film, and a gate between the rectifying member and the film plane and containing an aperture passing one after another parallel bands or rays, each band forming a portion only of the rays deflected at any one time by said rectifier so as to pass through the aperture sequentially rays forming consecutive fragments of a unit image from each of said parallel bands.

4. In the method of producing chronophotographs, the steps which consist in continuously moving a sensitized strip, forming a real image of a scene, and sequentially photographing upon said sensitized strip a series of complementary fragmentary portions, with parallel edges, of such image, such complementary fragmentary portions forming together a second real image which is a replica of the aerial image and lies in the plane of the sensitized strip.

LODEWYK J. R. HOLST.